US007912630B2

(12) United States Patent
Alewine et al.

(10) Patent No.: US 7,912,630 B2
(45) Date of Patent: Mar. 22, 2011

(54) METHOD AND SYSTEM FOR PERFORMING PROGRAMMATIC ACTIONS BASED UPON VEHICLE APPROXIMATE LOCATIONS

(75) Inventors: Neal J. Alewine, Lake Worth, FL (US); Jonathan L. Gabel, Charlotte, NC (US); Joseph G. Rusnak, Durham, NC (US); Anthony W. Wrobel, Jr., Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1090 days.

(21) Appl. No.: 11/011,635

(22) Filed: Dec. 14, 2004

(65) Prior Publication Data

US 2006/0129309 A1    Jun. 15, 2006

(51) Int. Cl.
*G01C 21/26* (2006.01)

(52) U.S. Cl. ............ 701/200; 705/14.49; 705/14.5; 705/14.58; 705/14.63; 701/24; 701/29; 340/995.1; 340/995.12

(58) Field of Classification Search ........... 701/200–213
See application file for complete search history.

(56) References Cited

U.S. PATENT DOCUMENTS

| | | | |
|---|---|---|---|
| 5,023,798 A | 6/1991 | Neukirchner et al. | |
| 5,627,549 A * | 5/1997 | Park | 701/300 |
| 5,664,948 A * | 9/1997 | Dimitriadis et al. | 434/307 R |
| 5,732,074 A | 3/1998 | Spaur et al. | |
| 5,732,383 A | 3/1998 | Foladare et al. | |
| 5,768,521 A * | 6/1998 | Dedrick | 709/224 |
| 5,838,277 A | 11/1998 | Loomis et al. | |
| 5,983,156 A | 11/1999 | Andrews | |
| 6,006,160 A | 12/1999 | Tamaki et al. | |
| 6,023,654 A | 2/2000 | Mohlenkamp | |
| 6,064,941 A * | 5/2000 | Nimura et al. | 701/210 |
| 6,131,067 A * | 10/2000 | Girerd et al. | 701/213 |
| 6,169,515 B1 | 1/2001 | Mannings et al. | |
| 6,199,045 B1 * | 3/2001 | Giniger et al. | 705/1 |
| 6,223,122 B1 * | 4/2001 | Hancock et al. | 701/200 |
| 6,259,381 B1 * | 7/2001 | Small | 340/988 |
| 6,339,745 B1 | 1/2002 | Novik | |
| 6,353,398 B1 * | 3/2002 | Amin et al. | 340/995.12 |
| 6,380,890 B1 | 4/2002 | Smith et al. | |
| 6,381,465 B1 * | 4/2002 | Chern et al. | 455/466 |
| 6,389,337 B1 | 5/2002 | Kolls | |
| 6,414,602 B2 * | 7/2002 | Polyakov | 340/691.6 |
| 6,421,608 B1 | 7/2002 | Motoyama et al. | |
| 6,446,004 B1 * | 9/2002 | Cao et al. | 701/213 |

(Continued)

FOREIGN PATENT DOCUMENTS

DE    19744602    4/1998

(Continued)

*Primary Examiner* — Jack Keith
*Assistant Examiner* — Jonathan M Dager
(74) *Attorney, Agent, or Firm* — Novak Druce + Quigg LLP

(57) ABSTRACT

A system for communicating between networked applications and vehicles that includes a vehicle response server and a vehicle response agent. The vehicle response server can manage communications between at least one vehicle and at least one application remotely located from the vehicle, wherein the application can provide activation contexts to the vehicle. The vehicle response agent can be disposed in the vehicle. The vehicle response agent can receive the activation contexts and determine event occurrences based in part upon the activation contexts and in part upon a location of the vehicle relative to previously defined geographical boundaries specified by the vehicle response server.

16 Claims, 5 Drawing Sheets

U.S. PATENT DOCUMENTS

| | | |
|---|---|---|
| 6,456,234 B1 | 9/2002 | Johnson |
| 6,459,967 B1 * | 10/2002 | Otto .................. 701/29 |
| 6,489,146 B2 | 12/2002 | Stemmer et al. |
| 6,490,519 B1 | 12/2002 | Lapidot et al. |
| 6,509,830 B1 | 1/2003 | Elliott |
| 6,559,769 B2 * | 5/2003 | Anthony et al. ............ 340/574 |
| 6,563,426 B2 * | 5/2003 | Herzberg ............... 340/573.1 |
| 6,564,143 B1 * | 5/2003 | Alewine et al. ............ 701/207 |
| 6,615,186 B1 * | 9/2003 | Kolls ...................... 705/26 |
| 6,665,613 B2 * | 12/2003 | Duvall ................... 701/213 |
| 6,704,564 B1 * | 3/2004 | Lange et al. ............. 455/412.1 |
| 6,711,474 B1 * | 3/2004 | Treyz et al. ................ 701/1 |
| 6,731,940 B1 * | 5/2004 | Nagendran ............... 455/456.1 |
| 6,785,551 B1 * | 8/2004 | Richard ................. 455/456.1 |
| 6,823,188 B1 * | 11/2004 | Stern ................... 455/456.1 |
| 7,089,264 B1 * | 8/2006 | Guido et al. ............. 707/104.1 |
| 7,209,807 B2 * | 4/2007 | Smith et al. ................ 701/1 |
| 7,212,916 B2 * | 5/2007 | Alewine et al. ............ 701/117 |
| 7,451,040 B2 * | 11/2008 | Miyahara ................ 701/200 |
| 2001/0029425 A1 | 10/2001 | Myr |
| 2001/0043148 A1 * | 11/2001 | Stewart ................... 340/988 |
| 2002/0013144 A1 * | 1/2002 | Waters et al. .............. 455/414 |
| 2002/0032035 A1 * | 3/2002 | Teshima .................. 455/456 |
| 2002/0032517 A1 | 3/2002 | Buckelew et al. |
| 2002/0049538 A1 | 4/2002 | Knapton et al. |
| 2002/0065691 A1 * | 5/2002 | Twig et al. .................. 705/7 |
| 2002/0087260 A1 | 7/2002 | Hancock et al. |
| 2002/0137489 A1 | 9/2002 | Dutta et al. |
| 2002/0158778 A1 | 10/2002 | Flick |
| 2002/0197988 A1 * | 12/2002 | Hellaker ................. 455/423 |
| 2003/0006913 A1 | 1/2003 | Joyce et al. |
| 2003/0046158 A1 * | 3/2003 | Kratky .................... 705/14 |
| 2003/0055555 A1 | 3/2003 | Knockeart et al. |
| 2003/0060214 A1 * | 3/2003 | Hendrey et al. ............ 455/456 |
| 2003/0060938 A1 * | 3/2003 | Duvall ..................... 701/2 |
| 2003/0060968 A1 | 3/2003 | MacPhail et al. |
| 2003/0063004 A1 * | 4/2003 | Anthony et al. ............ 340/574 |
| 2003/0137426 A1 * | 7/2003 | Anthony et al. ............ 340/574 |
| 2003/0187984 A1 * | 10/2003 | Banavar et al. ............ 709/225 |
| 2004/0076279 A1 * | 4/2004 | Taschereau ............ 379/218.01 |
| 2004/0083133 A1 * | 4/2004 | Nicholas et al. ............ 705/14 |
| 2004/0093291 A1 | 5/2004 | Bodin |
| 2004/0095239 A1 * | 5/2004 | Schwartz et al. ........ 340/539.13 |
| 2004/0153362 A1 * | 8/2004 | Bauer et al. ................ 705/10 |
| 2004/0172193 A1 * | 9/2004 | Monde et al. .............. 701/209 |
| 2004/0176987 A1 * | 9/2004 | Dial et al. ................. 705/4 |
| 2004/0201500 A1 * | 10/2004 | Miller et al. ............. 340/995.1 |
| 2004/0249519 A1 * | 12/2004 | Frink ...................... 701/3 |
| 2004/0267410 A1 * | 12/2004 | Duri et al. .................. 701/1 |
| 2004/0267617 A1 * | 12/2004 | Yanase ................... 705/14 |
| 2005/0073443 A1 * | 4/2005 | Sheha et al. ............. 340/995.1 |
| 2005/0097311 A1 * | 5/2005 | Gopalakrishnan et al. ... 713/100 |
| 2005/0159883 A1 * | 7/2005 | Humphries et al. .......... 701/207 |
| 2005/0216583 A1 * | 9/2005 | Cole et al. ................ 709/224 |
| 2006/0015233 A1 * | 1/2006 | Olsen et al. ................ 701/50 |
| 2006/0129283 A1 * | 6/2006 | Alewine et al. ............. 701/1 |
| 2007/0022384 A1 * | 1/2007 | Abbott et al. .............. 715/744 |
| 2007/0156513 A1 * | 7/2007 | Mastrianni et al. ........... 705/14 |
| 2008/0297488 A1 * | 12/2008 | Operowsky et al. .......... 345/173 |

FOREIGN PATENT DOCUMENTS

DE           10128873         12/2002

\* cited by examiner

300

| Data Item | ID | Units | Comments |
|---|---|---|---|
| Vehicle ID | ID | String | The vehicle's ID. This variable is useful for specification in the "Values required" list for requests where multiple vehicles might match and be returned. |
| Time | TIME | Time Value | The time to be used for expression evaluation. |
| Longitude | LONG | Degrees | The GPS-supplied longitude of the vehicle. |
| Latitude | LAT | Degrees | The GPS-supplied latitude of the vehicle. |
| Speed | SPEED | MPH/KPH | Vehicle speed at current location. Units should be configurable. |
| Odometer | ODO | Miles/Kilometers | Units should be configurable. |
| Direction | DIR | Degrees | Compass bearing at current location. |
| Engine Oil Level | OIL | Quarts/Liters | Units should be configurable. |
| Engine Temperature | TEMP | Degrees (F/C) | Temperature scale should be configurable. |
| Engine Tachometer | TACH | RPMs | |
| Tank Fuel Level | FUEL | Gallons/Liters | Units should be configurable. |
| Wiper Setting | WIPER | A setting number | A number corresponding to the current setting of the windshield wipers (off, low, medium, high, etc.). |

| Comparison Operator | Meaning |
|---|---|
| = | Equals |
| < | Less than |
| > | Greater than |
| <= | Less than or equals |
| >= | Greater than or equals |
| <> | Not equals |
| ! | Not (negation) |

| Function | Operand(s) | Purpose/return value |
|---|---|---|
| DistanceTo | 2-way location vector (longitude, latitude) | Returns the current distance (in meters) from the input location vector. |
| GridLocation | Start longitude, longitude division, end longitude, start latitude, latitude division, end latitude | Returns an integral grid sector identifier for the location grid defined by the input parameters. |
| Change | Output-Data Monitoring Value or built-in function | Returns the value (positive/negative) the input variable has changed since the last time checked. The initial baseline value is recorded at the time the form is received by the Agent, and is updated each time a response is sent to the Server. |
| PercentChange | Output-Data Monitoring Value or built-in function | Returns the value (positive/negative) the input variable has changed as a percentage since the last time checked. The initial baseline value is recorded at the time the form is received by the Agent, and is updated each time a response is sent to the Server. |

FIG. 5

METHOD AND SYSTEM FOR PERFORMING PROGRAMMATIC ACTIONS BASED UPON VEHICLE APPROXIMATE LOCATIONS

BACKGROUND

1. Field of the Invention

The present invention relates to the fields of computer software and networking and, more particularly, to a technique through which programmatic actions can be performed based upon vehicle approximate locations.

2. Description of the Related Art

Many applications exist that would benefit from knowing an approximate location of a vehicle and being able to trigger a programmatic action to occur within the vehicle based upon this approximate location or being able to take a programmatic action based upon the approximate location. Applications that would benefit from vehicle proximate location information include a vast variety of applications, such as push advertising, vehicle tracking, traffic mapping, vehicle navigation, and the like.

For example, a gas station application may want to present a "coupon" to a customer low on gas when that customer is approaching an associated gas station. In such an example, an in-vehicle programmatic action of informing the vehicle driver of the "coupon" can be executed. Further, an extra vehicle programmatic action can also be executed that causes the gas station to automatically apply the coupon when the targeted vehicle pays for fuel at a pump.

Despite the potential benefits of communicating data between vehicles and remotely located applications, conventional technologies have failed to overcome difficulties associated with remote applications communicating with vehicles. One technical difficulty relates to communications between several mobile vehicles and several remote applications hosted at a fixed location. While wireless communications are possible with a vehicle using methodologies such as those used for mobile telephony and vehicle GPS, these methodologies generally require either a constant communication connection or periodic status polling/status response messages to be conveyed between each vehicle and each remote application. Such communication methodologies are designed for point-to-point information exchanges and do not provide easily scalable solutions capable of being ported to vehicle/application communications. That is, when the number of remote applications and the number of vehicles grow, communications complexity and cost can grow geometrically. What is needed is a scalable, cost efficient, and secure technology for permitting applications to communicate with vehicles, resulting in context dependent programmatic actions that are based in part upon vehicle location.

SUMMARY OF THE INVENTION

One aspect of the present invention can include a system for communicating between networked applications and vehicles. The system can include a vehicle response server and a vehicle response agent. The vehicle response server can manage communications between at least one vehicle and at least one application remotely located from the vehicle, where the application can provide activation contexts to the vehicle. The vehicle response agent can be disposed in the vehicle. The vehicle response agent can receive the activation contexts and determine event occurrences based in part upon the activation contexts and in part upon a location of the vehicle relative to previously defined geographical boundaries specified by the vehicle response server.

Another aspect of the present invention includes a computerized method where an in-vehicle computing device communicates with at least one computing device outside the vehicle. The computerized method can include the step of defining geographical boundaries through which at least one vehicle travelway extends. An activation context can be conveyed from the at least one remote computing device to an in-vehicle device, wherein the activation context is dependent upon the geographical boundaries. As a vehicle travels along the vehicle travelway, the geographical boundary in which the vehicle resides can be determined. Additionally, an in-vehicle device can determine an occurrence of a context event specified by the activation context. The occurrence can be based in part upon the determined geographical boundary. The in-vehicle device can perform at least one previously determined programmatic action associated with the context event responsive to the occurrence. Different context events are actuated as the vehicle travels along the travelway based upon vehicle location as defined by the geographical boundaries.

It should be noted that the invention can be implemented as a program for a controlling computer to implement the functions described herein, or as a program for enabling a computer to perform the process corresponding to the steps disclosed herein. This program may be provided by storing the program in a magnetic disk, an optical disk, a semiconductor memory, any other recording medium, or distributed via a network.

BRIEF DESCRIPTION OF THE DRAWINGS

There are shown in the drawings, embodiments which are presently preferred, it being understood, however, that the invention is not limited to the precise arrangements and instrumentalities shown herein.

FIG. 3 is a table including several data items that can be used by a vehicle response language in accordance with an embodiment of the inventive arrangements disclosed herein.

FIG. 4 is a table including comparison operators that can be used by a vehicle response language in accordance with an embodiment of the inventive arrangements disclosed herein.

FIG. 5 is a table including several vehicle response language functions in accordance with an embodiment of the inventive arrangements disclosed herein.

DETAILED DESCRIPTION OF THE INVENTION

Figure 1:
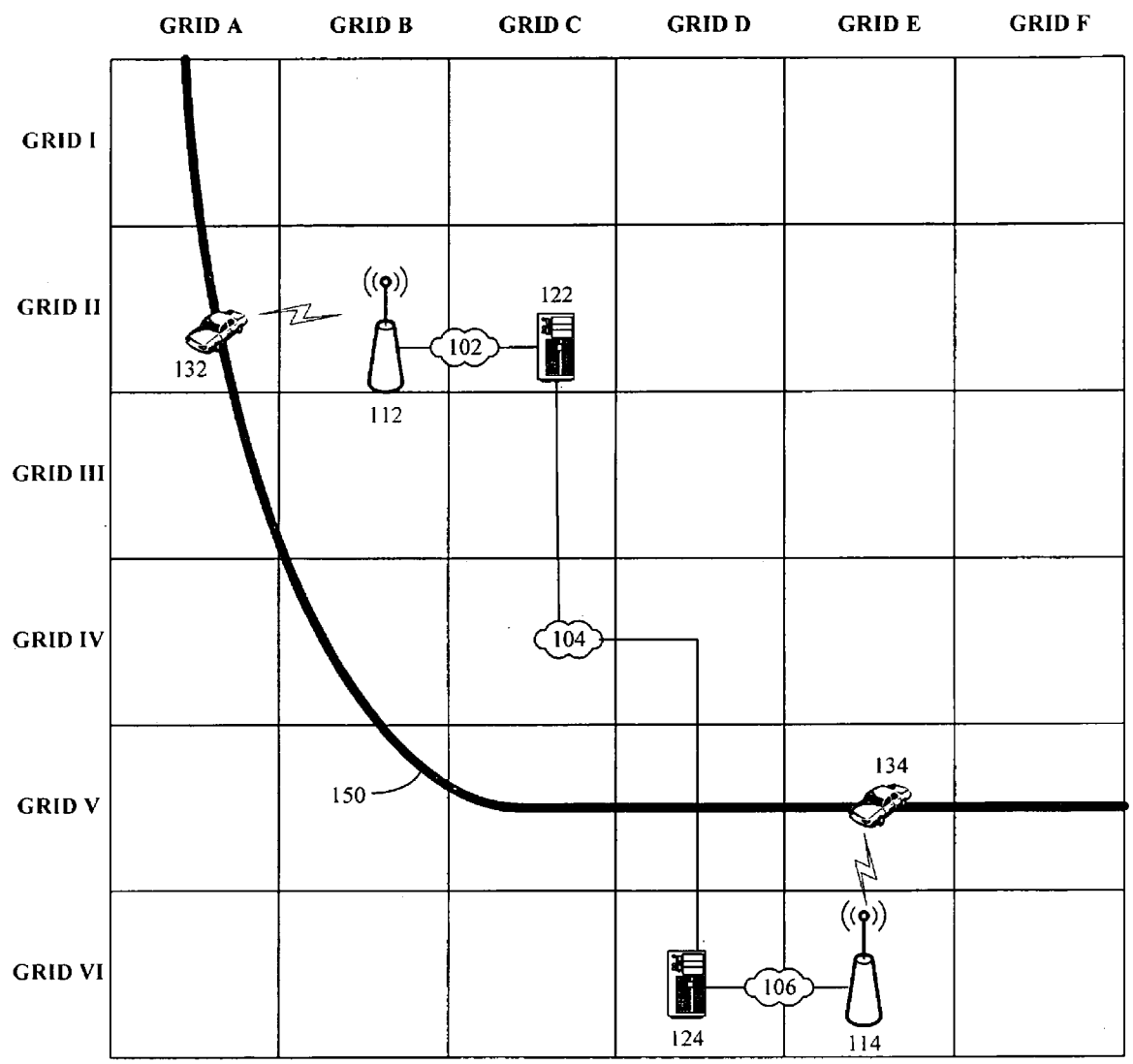
FIG. 1 is a schematic diagram illustrating a system in which vehicles communicate with remotely located applications in accordance with an embodiment of the inventive arrangements disclosed herein.

FIG. 1 is a schematic diagram illustrating a system 100 in which vehicles communicate with remotely located applications in accordance with an embodiment of the inventive arrangements disclosed herein.

In system 100, a grid is established across a designated geographical region. A vehicle travelway 150 can span multiple defined segments of the grid. As a vehicle 132, 134 travels along the travelway, information can be conveyed between the vehicle 132, 134 and one or more remotely located computing devices 122, 124.

The computing devices 122, 124 can be communicatively linked to each other via network 104 so that information can be exchanged between the remotely located devices. Additionally, device 122 can be communicatively linked to a wireless transceiver 112 via network 102 and device 124 can be communicatively linked to a wireless transceiver 114 via network 106. Wireless transceiver 112 can be within range of vehicle 132, thereby facilitating communications between vehicle 132 and device 122. Similarly, wireless transceiver 114 can be within communication range of vehicle 134. As vehicle 132 and vehicle 134 travel along travelway 150, different transceivers can be used to maintain communication between remotely located devices 122, 124 and vehicles 132, 134.

Devices 122, 124 can host multiple applications. These applications can interact with the vehicles by conveying event triggering conditions or activation contexts to the vehicles 132, 134. The vehicles 132 and 134 can receive the activation contexts and determine based upon state information within an in-vehicle computing device whether one or more contexts events defined in part by the activation contexts occur. These context events can result in the execution of one or more context-dependent programmatic actions.

Additionally, system 100 can be configured so that the different applications only communicate with vehicles located within defined geographical boundaries. For example, applications hosted on device 122 may define application contexts that apply only to vehicles located in the grid blocks defined by Grid A-I, Grid A-II, and Grid B-II. Similarly, applications hosted on device 124 may define activation contexts that apply only to vehicles located in the grid block defined by Grid E-V. Vehicles 132, 134 can ignore application contexts that specify conditions for geographical boundaries outside the vehicle's present location.

It should be noted that the present invention can be utilized in conjunction with any definable geographical boundary and the invention is not limited to a uniform grid that is shown in system 100. That is, geographical boundaries can vary in shape and are not intended to be limited to square grid units. Often, since wireless transceivers 112, 114 have approximately circular coverage areas, for example, circular geographical boundaries can be preferred. Other factors like terrain, road layouts, and the like, however, can result in rectangular geographical boundaries, oblong geographical boundaries, and the like being preferred. Additionally, even within a region, geographical boundaries need not be uniform meaning that one geographical boundary can be a different size and shape than another. Moreover, multiple logically defined grids can be specified for a given region, where different logical grids (each defining geographical boundaries for the same region) can be used by different applications.

It should also be noted that the vehicles 132, 134 can represent any transportation mechanism and that the travelway 150 can be any suitable pathway upon which the vehicle 132, 134 travels. For example, when the vehicle 132, 134 is a car, truck, or van, the travelway 150 can include a road, highway, bridge, and the like. When the vehicle 132, 134 is a boat, the travelway 150 can include a river or other waterway. When the vehicle 132, 134 is a train, the travelway 150 can include train tracks. When the vehicle 132, 134 is a plane, the travelway 150 can include a flight path.

Figure 2:
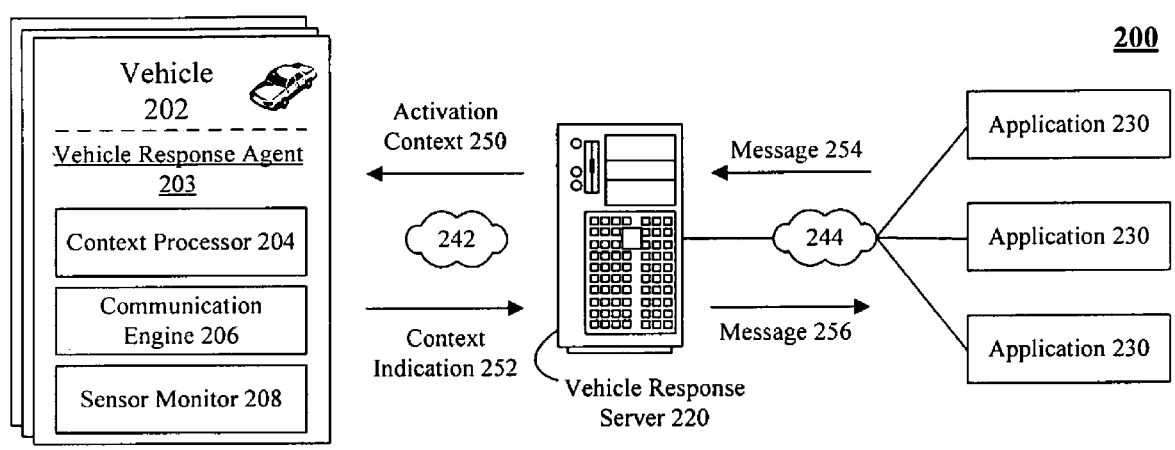
FIG. 2 is a schematic diagram illustrating a system in which applications can obtain and utilize vehicle context information in accordance with an embodiment of the inventive arrangements disclosed herein.

FIG. 2 is a schematic diagram illustrating a system 200 in which applications can communicate with vehicles in accordance with an embodiment of the inventive arrangements disclosed herein. In one embodiment, the system 200 can be used for communications between vehicle 132 and device 122 and between vehicle 134 and device 124.

System 200 can include at least one vehicle 202, a vehicle response server 220, and one or more applications 230. The vehicle 202 can be any device in, upon, or by which a person or property is or may be transported or drawn upon a travelway, excepting devices moved by human power or used exclusively upon rails or tracks. For example, the vehicle 202 can include an automobile, truck, van, motorcycle, moped, recreational vehicle (RV), and other such transportation devices.

The vehicle 202 can include an in-vehicle device within which a vehicle response agent 203 resides. The vehicle response agent 203 can include a machine-readable set of programmatic instructions configured to receive an activation context 250 from the vehicle response server 220, extract conditions from the activation context 250 to generate at least one monitored vehicle-specific event, to monitor for the event occurrence, and to wirelessly convey an indication of the event, which can be referred to as a context indication 252, to the vehicle response server 220. The activation context 250 can be associated with one or more geographical boundaries in which the vehicle 202 is located. The activation context 250 can be selectively enabled or disabled in accordance with the associated geographical boundaries.

In one embodiment, the vehicle response agent 203 can include a context processor 204, a communication engine 206, and a sensor monitor 208. The context processor 204 can translate one or more activation contexts 250 into one or more vehicle-specific events. That is, the context processor 204 can place generic vehicle agnostic queries into a vehicle-specific context. The context processor 204 can then monitor input from various sensors of the vehicle 202 to determine if the vehicle-specific events occur. When the events do occur, the vehicle response agent 203 can take one or more actions specified within the activation context 250. For example, the vehicle response agent 203 can convey the context indication 252 to the vehicle response server 220.

The communication engine 206 can establish a communication link across network 242 with the vehicle response server 220 through which digitally encoded information can be conveyed, such as the activation context 250 and the context indication 252. The network 242 can be any wireless network, including, but not limited to one or more wireless local area networks, a satellite network, a radio network, a mobile telephony network, and the like.

The sensor monitor 208 can be a memory and processing unit configured to receive vehicle sensor input. The sensor monitor 208 can correlate the vehicle sensor input into vehicle specific conditions, which in turn can activate the vehicle specific events established by the context processor 204. Sensor monitor 208 can include any of a variety of sensors including, but not limited to, fluid level sensors, temperature sensors, air pressure sensors, navigational sensors, speed and distance sensors, and other sensors that measure vehicle-specific values.

The sensor monitor 208 can be linked to a vehicle's computer control module, a Global Positioning System (GPS), a mobile telephony system, electronic controls such as powered windows, and other in-vehicle systems. Additionally, sensors not typically included within vehicle 202 can be added to the vehicle 202 to provide input for the sensor monitor 208. For example, a barometer can be added to the vehicle 202 to provide environmental input to one or more weather-based applications 230. In another example, a pre-paid toll sensor/transceiver can be added to the vehicle 202 to record/transmit information to toll-related applications 230.

The vehicle response server 220 can be any computing device that manages communications between at least one vehicle 202 and at least one application 220 remotely located from the vehicle 202. The vehicle response server 220 can consolidate requests from the various applications 230 so that the vehicle 202 does not receive a series of redundant information requests. The vehicle response server 220 can also include security and authentication routines to ensure that only those application requests 230 approved by the vehicle 202 owner are conveyed to the vehicle. Consequently, the vehicle response server 220 can function as a firewall that only permits approved and sanitized information to be conveyed to the vehicle response agent 203, where sanitation can check messages for viruses and other malicious software before the messages are conveyed to the vehicle 202.

In one embodiment, the vehicle response server 220 can represent a single server or network element. The vehicle response server 220 can also be a logical entity consisting of a multitude of geographically distributed hardware components that are communicatively linked to one another via a network.

Each application 230 can include a set of machine-readable instructions designed to perform a specific instruction. Application 230 can include one program or a group of programs that are designed to automatically execute at least one context-dependent programmatic action based upon an event occurrence within vehicle 202. Application 230 can be an application hosted by the vehicle response server 220 and can be an application remotely located and functionally independent of the vehicle response server 220.

Each application 230 can convey a message 254 to the vehicle response server 220 that indicates a set of conditions for triggering the context dependent programmatic action. The vehicle response sever 220 can trigger the context dependent action via message 256, which can include any and all parameters needed by the application 230, such as vehicle specific values derived from a sensor or data store accessible to the vehicle response server 220.

Each application can be linked to the vehicle response server 220 through a network 244. The network 244 can represent any communication mechanism capable of conveying digitally encoded information. More specifically, the network 244 can include a computer network such as a Local Area Network (LAN) or a Wide Area Network (WAN), a telephony network such as a Public Switched Telephony Network (PSTN) or a mobile telephony network, a cable network, a satellite network, a broadcast network, and the like. The network 244 can use wireless as well as line-based communication pathways.

Further, the network 244, as well as the network 242, can encode information in accordance with any communication protocol, such as a packet-based communication protocol or a circuit based communication protocol. Networks 242 and 244 can also convey information in a secure fashion, where conveyed information can be encrypted before transmittal, thereby requiring an information recipient to utilize a corresponding decryption key (password, certificate, public key, and private key) to access the conveyed information in a comprehensible fashion.

In one contemplated arrangement, the vehicle response agent 203, the vehicle response server 220, the application 230, and combinations thereof can communicate using messages written in a defined vehicle response language that includes data types and functions specifically defined for obtaining and processing vehicle context information.

FIG. 3 is a table 300 including several data items that can be used by a vehicle response language in accordance with an embodiment of the inventive arrangements disclosed herein. Table 300 can include, but is not limited to data items for vehicle identification, time, longitude, latitude, speed, odometer, direction, engine oil level, engine temperature, engine tachometer, tank fuel level, and wiper settings. Each data item has an associated short identifier, a unit type, and a brief description.

As shown in table 300, Vehicle ID has a short identifier of ID, can be a string value, and can uniquely define a vehicle. Time has a short identifier of TIME, can be a time value, and can be used for expression evaluation. Longitude has a short identifier of LONG, can have a unit type of degrees, and can be a GPS supplied longitude value for a vehicle. Latitude has a short identifier of LAT, can have a unit type of degrees, and can be a GPS supplied latitude value for a vehicle. Speed has a short identifier of SPEED, can have a unit type of miles per hour or kilometers per hour, and can represent a current vehicle speed. Odometer has a short identifier of ODO, can have a unit type of miles or kilometers, and can represent a vehicle's permanent or trip odometer value. Direction has a short identifier of DIR, can have a unit type of degrees, and can represent a compass bearing of the vehicle. Engine Oil Level has a short identifier of OIL, can have a unit type of quarts or liters, and can represent a level of oil for a vehicle. Engine Temperature has a short identifier of TEMP, can have a unit type of degrees Fahrenheit or Celsius, and can specify an engine temperature. Engine Tachometer has a short identifier of TACH, can have a unit type of revolutions per minute, and can be a tachometer value for the vehicle. Tank Fuel Level has a short identifier of FUEL, can have a unit type of gallons or liters, and can signify how much gas is currently in a vehicle's tank. Wiper Setting has a short identifier of WIPER, can have a unit type of setting level, and can correspond to the current setting of the windshield wipers of a vehicle.

It should be appreciated that the data types of table 300 are not intended as an exhaustive list of data types for the vehicle response language, and that other similar data types are contemplated herein. For example, data types for headlamp setting, battery charge, tire pressure, exterior temperature, turn signals, radio station, radio volume, seat position, window setting, rear view mirror adjustment, and other vehicle specific data types can be included in the vehicle response language.

It should also be appreciated that the data types of table 300 can be used not only to obtain current vehicle conditions but may also be used to remotely adjust these conditions. For example, an authorized remote application can use vehicle response language data types to close a window or lock a door of a vehicle that has been stationary for a predetermined period.

FIG. 4 is a table 400 including comparison operators that can be used by a vehicle response language in accordance with an embodiment of the inventive arrangements disclosed herein. The comparison operators can include operators for EQUALS, LESS THAN, GREATER THAN, LESS THAN OR EQUAL TO, GREATER THAN OR EQUAL TO, NOT EQUAL, and NOT. The vehicle response language is not limited to these comparison operators, and other operators can be utilized. For example, a SYNONYM operator (not shown) can be utilized by the vehicle response language.

In addition to the comparison operators, logical operators including, but not limited to, AND, OR, XOR, and NOT can be used to form logical expressions. Arithmetic functions can also be used to mathematically manipulate compatible numeric data types. It should be appreciated that expressions can be nested, parenthetically grouped, and negated. Further, the order of operation processing and nesting robustness can be configured by design implementers to suit programming needs for which the vehicle response language is intended to satisfy.

FIG. 5 is a table 500 including several vehicle response language functions in accordance with an embodiment of the inventive arrangements disclosed herein. The functions can include, but are not limited to, a DistanceTo function, a GridLocation function, a Change function, and a PercentChange function, each having defined operands and return values.

The DistanceTo function can have a two-way location vector operand and can return a distance. The GridLocation function can have operands for start longitude, longitude division, end longitude, start latitude, latitude division, and end latitude. GridLocation can return an integral grid sector identifier for location grid. Change can have an input parameter of varying type and can return a positive/negative value indicating a change in the input parameter since a designated time, which can be the last time the Change function was called. PercentChange can be similar to Change, except the return value is expressed as a percentage.

It should be appreciated that the functions of the vehicle response language are not to be limited to those shown in table 500 and that any of a variety of other functions are contemplated herein. For example, the vehicle response language can include functions for remotely adjusting a data type to a user-established setting, obtaining a data type value, presenting a notification to a driver, and other such functions.

Figure 6:
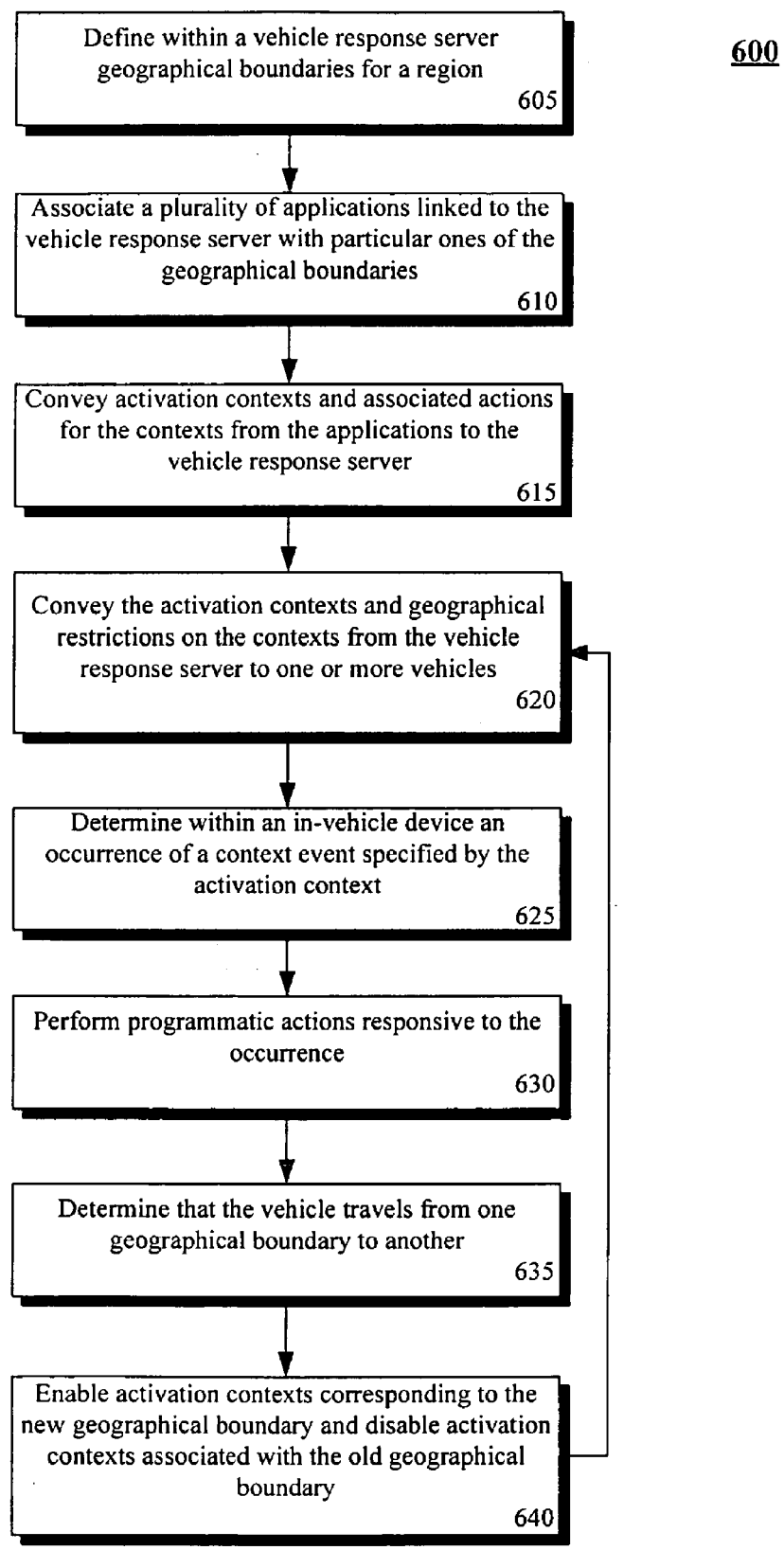
FIG. 6 is a flow chart of a method for finding a vehicle proximate location in accordance with an embodiment of the inventive arrangements disclosed herein.

FIG. 6 is a flow chart of a method 600 for finding a vehicle proximate location in accordance with an embodiment of the inventive arrangements disclosed herein. Method 600 can be performed in the context of system 100 and/or system 200 as well as within the context of any other system in which programmatic actions that are dependent upon vehicle approximate locations occur.

The method 600 can begin at step 605 where a vehicle response server can define several geographical boundaries for a region. In step 610, applications linked to the vehicle response server can be associated with particular ones of the defined geographical boundaries. In step 615, the applications can convey application contexts and associated actions for the contexts to the vehicle response server.

In step 620, the vehicle response server can convey the activation contexts and geographical restrictions for the contexts to one or more vehicles. In one embodiment, only those vehicles within a given geographical boundary are conveyed activation contexts that apply to that boundary. The conveyance of activation contexts can occur through any of a variety of wireless communication mechanisms. These communication mechanisms can include both targeted and untargeted mechanisms with the untargeted communication mechanisms being preferred for areas with significant population density for reasons of scalability.

For example, the voice response server can broadcast the activation contexts for a geographical area from a wireless transceiver located within that area. In another example, the voice response server can use a mobile telephony network to establish a communication link with a vehicle and convey over this link the activation context information. Mobile telephony networks can be used to supplement coverage areas having a relatively low user population, which would not justify the expense of dedicated broadcast transceivers.

In step 625, after the activation context has been conveyed to a vehicle, an in-vehicle device can determine based upon vehicle state information and the activation context when one or more context events occur. In step 630, one or more in-vehicle programmatic actions can occur responsive to event occurrences. Particular ones of these programmatic actions can result in vehicle-specific information being conveyed to one or more remote applications linked to the vehicle response server. The vehicles-specific information can include information obtained from vehicle sensors, such as a fluid level of the vehicle, a speed of the vehicle, and the like. The remote applications can perform programmatic actions responsive to receiving the vehicle-specific information.

For example, in one embodiment, a remote application can includes a geofencing application. A programmatic action performed by the in-vehicle device can alerts the geofencing application when the vehicle travels from one of the geographical boundaries to another. The geofencing application can then take appropriate responsive actions, such as informing an agent that the vehicle has traveled beyond defined geofenced areas for that vehicle.

In another situation, the remote application can include a traffic mapping application. A programmatic action performed by the in-vehicle device can provides a speed of the vehicle and a location of the vehicle to the traffic mapping application. The traffic application can use information conveyed from a plurality of vehicles to determine if traffic is flowing smoothly, if traffic is slow, or if traffic has stopped. The traffic application can provide suggestions based upon discerned traffic patterns to dynamically re-route vehicles from high congestion travelways to alternative travelways.

In still another embodiment, a remote application can be vehicle tracking application that is accessible by client computing devices via a Web browser. A programmatic action of the in-vehicle device can provide location information to the vehicle tracking application. This location information can be presented to authorized users via the Web browser.

While the in-vehicle device and remote applications are performing programmatic actions, the vehicle itself can be traveling from one geographical boundary to another. Thus in step 635, a determination (made from within the in-vehicle device, from within the vehicle response server, or both) can be made that the vehicle travels from one geographical boundary to another. In step 640, activation contexts corresponding to the new geographical boundary can be enabled and activation contexts corresponding to the old geographical boundary can be deactivated. The method can then loop from step 640 to step 620 where new activation context for the new boundaries can be conveyed to the vehicles and responsive programmatic actions can be taken.

It should be appreciated that the in-vehicle device can receive different activation contexts from different applications. The received activation contexts can be bound by geographical boundaries so that context events are only actuated when the vehicle is located within a geographical boundary corresponding to a geographical boundary to which the application that conveyed the associated activation context is bound.

It should be noted that when data is a standardized vehicle response language specifically designed for vehicle-based information exchanges can be used to exchange data between the in-vehicle device and the vehicle response server and between the vehicle response server and the different applications. For example, the standardized vehicle response language used in particular embodiment of method 600 can include items defined in FIG. 3, comparison operators defined in FIG. 4, and/or functions define in FIG. 5.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computerized method for facilitating communications between at least one vehicle and at least one application remotely located from the vehicle, the method comprising the steps of:

defining by a vehicle response server a plurality of geographical boundaries for a region, wherein the vehicle response server includes a plurality of remotely located computing devices communicatively linked to one another via a network, each computing device communicating with vehicles located in different geographical boundaries;

associating at least one application with each computing device so that the at least one application is hosted on the computing device;

conveying activation contexts and associated actions for the contexts from the at least one application to the associated computing device;

as a vehicle having a vehicle response agent travels, determining a geographical boundary in which the vehicle resides;

conveying activation contexts of at least one application hosted on the computing device associated with the determined geographical boundary from the computing device to the vehicle within the determined geographical boundary, wherein different activation contexts are conveyed to the vehicle and received by the vehicle response agent within the vehicle as the vehicle travels from one geographical boundary to another;

translating the received activation contexts into vehicle-specific events by a context processor of the vehicle response agent;

obtaining vehicle state information by monitoring a plurality of vehicle sensors;

determining by the context processor an occurrence of a vehicle-specific event based upon the vehicle state information;

conveying a context indication from the vehicle response agent within the vehicle to an application associated with the activation context corresponding to the determined vehicle-specific event via the computing device responsive to the occurrence of the vehicle-specific event; and performing by the application at least one programmatic action responsive to receiving the context indication from the vehicle response agent.

2. The computerized method of claim 1, wherein the vehicle response server imposes a geographical boundary constraint upon the activation context received from the at least one remotely located application before conveying the activation context to the vehicle response agent within the vehicle.

3. The computerized method of claim 1, further comprising the steps of:

administratively modifying the defined geographical boundaries within the vehicle response server; and conveying the modified geographical boundaries to the vehicle response agent within the vehicle, thereby automatically and dynamically changing conditions for the occurrence of the context event.

4. The computerized method of claim 1, wherein the vehicle response agent within the vehicle receives different activation contexts from different applications, wherein each of the different applications is bound by the geographical boundaries so that context events are only actuated when the vehicle is located within a geographical boundary corresponding to a geographical boundary to which the application that conveyed the associated activation context is bound.

5. The computerized method of claim 4, wherein the vehicle-specific information includes a context indication from the vehicle response agent within the vehicle to the application that conveyed the activation context that triggered the occurrence.

6. The computerized method of claim 5, wherein the context indication includes at lest one value obtained from a vehicle sensor of the vehicle.

7. The computerized method of claim 6, wherein the vehicle sensor indicates a level of fluid within the vehicle.

8. The computerized method of claim 4, wherein data conveyed between the vehicle response agent within the vehicle and the different applications are conveyed to the vehicle response server before being conveyed to an intended destination, where the vehicle response server is a communication intermediary between the vehicle response agent within the vehicle and the different applications.

9. The computerized method of claim 4, wherein data is exchanged between the vehicle response agent within the vehicle and the vehicle response server and between the vehicle response server and the different applications utilizing a standardized vehicle response language specifically designed for vehicle-based information exchanges.

10. The computerized method of claim 1, wherein the vehicle response server includes a geofencing application, wherein the programmatic action performed by the vehicle response agent within the vehicle alerts the geofencing application when the vehicle travels from one of the geographical boundaries to another.

11. The computerized method of claim 1, wherein the remote computing device includes a traffic mapping application, wherein the programmatic action performed by the vehicle response agent within the vehicle provides a speed of the vehicle and a location of the vehicle to the traffic mapping application.

12. The computerized method of claim 1, wherein the vehicle response server includes a Web browser through which a vehicle tracking application is accessed, wherein the vehicle response agent within the vehicle provides location information to the vehicle tracking application.

13. A computerized system for facilitating communications between at least one vehicle and at least one application remotely located from the vehicle based on vehicle approximate locations, the system comprising:

a vehicle response server including a plurality of remotely located computing devices communicatively linked to one another via a network, the vehicle response server configured to:
- define a plurality of geographical boundaries for a region, each computing device communicating with vehicles located in different geographical boundaries;
- associate, at least one application with each computing device so that the at least one application is hosted on the computing device;
- receive activation contexts and associated actions for the contexts from the at least one application to the associated computing device;
- determine a geographical boundary in which a vehicle resides as the vehicle travels; and
- convey activation contexts of at least one application hosted on the computing device associated with the determined geographical boundary to the vehicle within the determined geographical boundary, wherein different activation contexts are conveyed to the vehicle and received by a vehicle response agent within the vehicle as the vehicle travels from one geographical boundary to another;

a vehicle response agent disposed in the vehicle configured to:
- receive the activation contexts conveyed from the vehicle response server;
- translate the received activation contexts into vehicle-specific events by a context processor of the vehicle response agent;
- obtain vehicle state information by monitoring a plurality of vehicle sensors;
- determine an occurrence of a vehicle-specific event based upon the vehicle state information; and
- convey a context indication to an application associated with the activation context corresponding to the determined vehicle-specific event via the computing device responsive to the occurrence of the vehicle-specific event;

wherein the application performs at least one programmatic action responsive to receiving the context indication from the vehicle response agent.

14. The system of claim 13, wherein the vehicle response agent further comprises:
- a context processor configured to translate said activation contexts into vehicle-specific conditions for the event occurrences;
- a communication engine configured to wirelessly exchange digitally encoded information with the vehicle response server; and
- a sensor monitor configured to receive vehicle sensor input and correlate the vehicle sensor input to the vehicle specific conditions.

15. The system of claim 14, wherein the vehicle response server and the vehicle response agent utilize a vehicle response language that includes data types and functions specifically defined for obtaining and processing vehicle sensor input.

16. A machine-readable storage having stored thereon, a computer program having a plurality of code sections, said code sections executable by a machine for causing the machine to perform the steps of:
- defining by a vehicle response server a plurality of geographical boundaries for a region, wherein the vehicle response server includes a plurality of remotely located computing devices communicatively linked to one another via a network, each computing device communicating with vehicles located in different geographical boundaries;
- associating at least one application with each computing device so that the at least one application is hosted on the computing device;
- conveying activation contexts and associated actions for the contexts from the at least one application to the associated computing device;
- as a vehicle having a vehicle response agent travels, determining a geographical boundary in which the vehicle resides;
- conveying activation contexts of at least one application hosted on the computing device associated with the determined geographical boundary from the computing device to the vehicle within the determined geographical boundary, wherein different activation contexts are conveyed to the vehicle and received by a vehicle response agent within the vehicle as the vehicle travels from one geographical boundary to another;
- translating the received activation contexts into vehicle-specific events by a context processor of the vehicle response agent;
- obtaining vehicle state information by monitoring a plurality of vehicle sensors;
- determining by the context processor an occurrence of a vehicle-specific event based upon the vehicle state information;
- conveying a context indication from the vehicle response agent within the vehicle to an application associated with the activation context corresponding to the determined vehicle-specific event via the computing device responsive to the occurrence of the vehicle-specific event; and
- performing by the application at least one programmatic action responsive to receiving the context indication from the vehicle response agent.

* * * * *